US012609618B2

(12) United States Patent
Hariharan et al.

(10) Patent No.: US 12,609,618 B2
(45) Date of Patent: Apr. 21, 2026

(54) CONTROL CIRCUIT FOR A BUCK-BOOST POWER CONVERTER

(71) Applicant: Renesas Design (UK) Limited, Bourne End (GB)

(72) Inventors: Kamala Hariharan, Morgan Hill, CA (US); Nicolas Borfigat, Gilbert, AZ (US); Rosario Pagano, Phoenix, AZ (US)

(73) Assignee: Renesas Design (UK) Limited, Bourne End (GB)

( * ) Notice: Subject to any disclaimer, the term of this patent is extended or adjusted under 35 U.S.C. 154(b) by 154 days.

(21) Appl. No.: 17/965,356

(22) Filed: Oct. 13, 2022

(65) Prior Publication Data

US 2024/0136928 A1 Apr. 25, 2024

(51) Int. Cl.
*H02M 3/158* (2006.01)
*H02M 1/00* (2007.01)

(52) U.S. Cl.
CPC ....... *H02M 3/1582* (2013.01); *H02M 1/0025* (2021.05)

(58) Field of Classification Search
CPC ... H02M 1/0025; H02M 3/1582; H02M 3/158
See application file for complete search history.

(56) References Cited

U.S. PATENT DOCUMENTS 5,134,355 A * 7/1992 Hastings ............. H02M 1/4208
323/224
9,362,828 B2 * 6/2016 Peker .................. H02M 3/1582

| | | | |
|---|---|---|---|
| 10,075,075 B2 | 9/2018 | Zhang | |
| 2007/0075687 A1* | 4/2007 | Ishii ..................... | H02M 3/1582 323/225 |
| 2012/0038334 A1* | 2/2012 | Peng ................... | H02M 3/1588 323/282 |
| 2012/0146594 A1* | 6/2012 | Kobayashi .......... | H02M 3/1582 323/234 |
| 2014/0084883 A1* | 3/2014 | Tanabe ................ | H02M 3/1582 323/271 |
| 2014/0266085 A1* | 9/2014 | Unno ...................... | H02M 3/04 323/234 |
| 2017/0077817 A1* | 3/2017 | Houston ............. | H02M 3/1582 |
| 2017/0155324 A1* | 6/2017 | Choquet ............. | H02M 3/1582 |

(Continued)

OTHER PUBLICATIONS

DE Office Action dated Dec. 9, 2025 issued in DE 10 2023 207 084.7.

*Primary Examiner* — Gustavo A Rosario-Benitez
(74) *Attorney, Agent, or Firm* — SCULLY, SCOTT, MURPHY & PRESSER, P.C.

(57) ABSTRACT

The present document describes a control circuit for controlling a buck-boost power converter, which is configured to provide at an output node of the power converter an output current at an output voltage based on electrical power at an input voltage which is provided at an input node of the power converter. The control circuit is configured to determine an operation mode that the power converter is operated in; to determine an error voltage signal based on the output voltage, based on a reference voltage for the output voltage and based on the determined operation mode of the power converter; and to determine a control signal for controlling one or more power switches of the power converter in dependence of the error voltage signal.

16 Claims, 6 Drawing Sheets

(56)          References Cited

U.S. PATENT DOCUMENTS

| 2018/0254704 | A1* | 9/2018 | Unno | ................... | H02M 3/1582 |
| 2021/0184577 | A1* | 6/2021 | Yang | ................... | H02M 1/0003 |
| 2022/0069708 | A1* | 3/2022 | Karri | ................... | H02M 1/0003 |

\* cited by examiner 221          222          223

0V

DY1

231

A

215

DY2

231

B

400 determining an operation
mode

401 determining an error voltage
signal

402 determining a control signal

403

CONTROL CIRCUIT FOR A BUCK-BOOST POWER CONVERTER

BACKGROUND

Technical Field

The present document relates to a control circuit for a buck-boost power converter. In particular, the present document relates to the compensation of glitches of the output voltage during mode transition of a buck-boost power converter.

Description of Related Art

Battery-operated portable devices have increasing performance requirements, in particular with regards to the load current and the operational efficiency. In applications where the input voltage is always higher than the output voltage, a buck power converter may be used. For applications where the input voltage is always lower than the output voltage a boost power converter may be used.

In a battery-operated device, the input voltage is provided by battery cells. As a result of this, there may be a relatively wide variation of the range of the input voltage, as the voltage of a battery cell is dependent on its charge state. Since the voltage of a battery cell decreases as it is discharged, the input voltage to the power converter may be higher, approximately equal to, or lower than the output voltage. For such a situation, a buck-boost power converter may be used, wherein the buck-boost power converter has three main operating modes:

Buck Mode→$V_{IN} > V_{OUT}$
Buck-Boost Mode→$V_{IN} \sim V_{OUT}$
Boost Mode→$V_{IN} < V_{OUT}$ FIG. 1A illustrates an example buck-boost power converter 100 which is configured to convert the input voltage 102 into an output voltage 103, while proving a certain output or load current 104. The power converter 100 comprises a control unit 101 for controlling the power switches 111, 112, 113, 114 (e.g., field effect transistors) of the power converter 110. The power converter 100 may be operated in a certain operation mode, notably a buck mode, a buck-boost mode or a boost mode, depending on the conversion ratio between the input voltage and the output voltage.

Each operation mode comprises a sequence of states of the power converter 100 within an operation cycle. The operation cycle, i.e., the sequence of states, is repeated at a certain, pre-determined, cycle rate. During each operation cycle, the inductor 115 is magnetized and demagnetized, thereby providing a certain average output or load current 104 at the output of the power converter 100.

At the transition between different operation modes, notably between the buck mode and the buck-boost mode, or between the buck-boost mode and the boost mode, a glitch of the output voltage 103 may be generated. The present document is directed at the technical problem of avoiding such glitches during mode transition in an efficient and reliable manner. The technical problem is solved by the independent claims. Preferred examples are described in the dependent claims.

SUMMARY

According to an aspect, a control circuit for controlling a buck-boost power converter is described. The power converter is configured to provide at an output node of the power converter an output current at an output voltage based on electrical power at an input voltage which is provided at an input node of the power converter.

The control circuit is configured to determine an operation mode that the power converter is operated in. Furthermore, the control circuit is configured to determine an error voltage signal based on the output voltage, based on a reference voltage for the output voltage and based on the determined operation mode of the power converter. In other words, an error voltage signal which is dependent on the output voltage that is set by the reference voltage may be created. The error voltage signal may be dependent on the mode of operation. The control circuit is further configured to determine a control signal for controlling one or more power switches of the power converter in dependence of the error voltage signal.

According to another aspect, a method for controlling a buck-boost power converter is described. The method comprises of determining an operation mode that the power converter is operated in. Furthermore, the method comprises of determining an error voltage signal based on the output voltage and based on the determined operation mode of the power converter. The method further comprises of determining a control signal for controlling one or more power switches of the power converter in dependence of the error voltage signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION

Figure 1A:
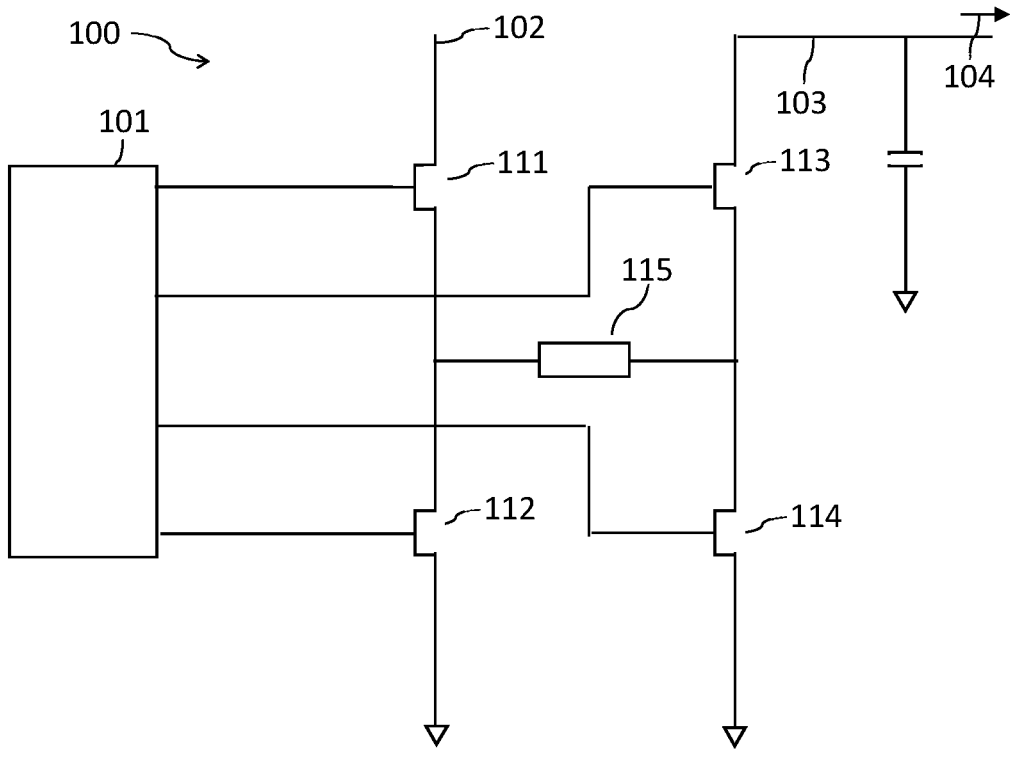
FIG. 1A illustrates an example buck-boost converter.
Figure 1B:
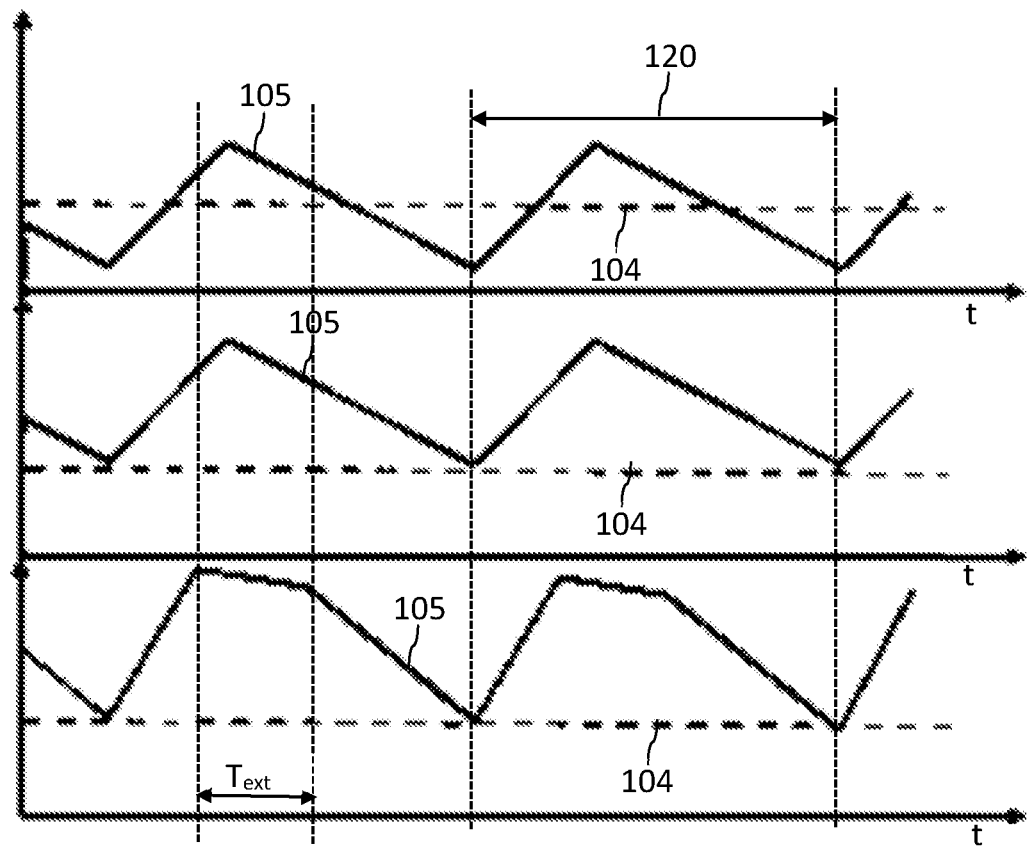
FIG. 1B illustrates example inductor currents and load currents of the power converter of FIG. 1A for different operation modes.

As indicated above, the present document is directed at providing a precise regulation of the output voltage of a buck-boost power converter 100 within different operation modes. In this context, FIG. 1B illustrates the waveforms of the inductor current 105 through the inductor 115 for the different operation modes, notably for the buck mode (upper diagram), the boost mode (middle diagram) and the buck-boost mode (lower diagram). Furthermore, FIG. 1B illustrates the output and/or load current 104 which is provided at the output of the power converter 100. In addition, FIG. 1B indicates the duration $T_s$ of an operation cycle 120 of each of the operation modes. Furthermore, the extension time $T_{ext}$ used within the buck-boost mode is indicated.

Depending on the operation mode, the same duty cycle corresponds to a different current 104 delivered to the output of the power converter 100. In particular, $$\langle I_{L,BUCK} \rangle = i_{Load}$$

for the buck mode, $$\langle I_{L,BOOST} \rangle = \frac{iLoad}{1 - D_{BST}}$$

for the boost mode, and $$\langle I_{L,BUCK-BOOST} \rangle = \frac{iLoad}{1 - D_{BST}}$$

$$D_{BST} = \frac{M - \dfrac{T_{EXT}}{T_S}}{1 + M}$$

$$= V_{OUT}/V_{IN}$$

for the buck-boost mode. Due to this, a voltage glitch may be created at a mode transition between two different operation modes of the power converter 100.

Figure 2A:
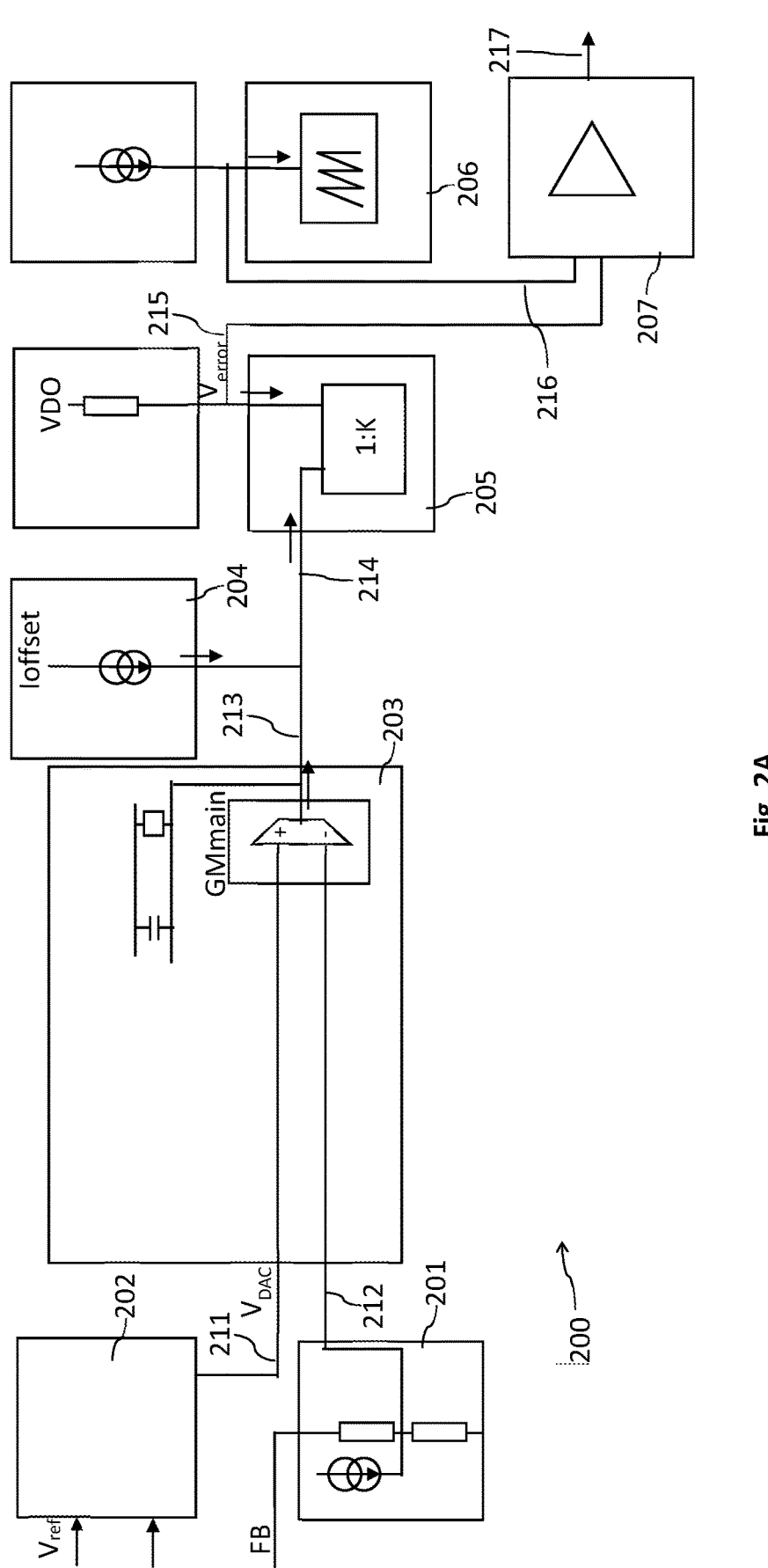
FIG. 2A shows an example control circuit for controlling the duty cycle of a buck-boost converter.

FIG. 2A shows an example control circuit 200 for controlling a buck-boost power converter 100, in particular for setting the duty cycle of the buck-boost power converter 100, within an operation mode of the power converter 100. The control circuit 200 comprises a feedback unit 201 which is configured to generate a feedback voltage 212 based on the output voltage 103 of the power converter 100. The feedback unit 201 may comprise a voltage divider to generate a feedback voltage 121 which is a defined fraction of the output voltage 103. Furthermore, the control circuit 200 comprises a reference unit 202 which is configured to provide a reference voltage 211 for the output voltage 103.

The feedback voltage 212 may be compared with the reference voltage 211 within a comparison unit 203, thereby providing a delta signal 213 (notably a delta current or a delta voltage), which is indicative of the deviation of the feedback voltage 212 from the reference voltage 211. The comparison unit 203 may comprise a comparator, notably an operational amplifier based voltage comparator. The delta signal 213 may be offset using an offset unit 204, thereby providing a corrected delta signal 214 which may be amplified within an amplification unit 205, e.g., within a current mirror, to provide the error voltage 215.

The error voltage 215 may be compared with a (sawtooth) ramp voltage 216 (comprising a periodic (sawtooth) ramp with a periodicity in accordance to the duration of the operation cycle 120) which may be provided by a ramp signal unit 206. The ramp voltage 216 may be generated in dependence of the inductor current 105, in particular in dependence of the peak of the inductor current 105.

The error voltage 215 and the ramp voltage 216 may be compared within a PWM (pulse width modulation) comparator unit 207 to provide the control signal 217 for the power switches 111, 112, 113, 114 of the power converter 100. The control signal 217 may be indicative of the duty cycle which is to be used for operating the power converter 100. The control signal 217 may be used by the control unit 101 to generate the drive signals for controlling the power switches 111, 112, 113, 114.

When using peak-current based control, the following applies:

$$[V_{DAC} - (V_{OUT}/FB_{ratio})] \times g_{mLoop} = I_L/N_s + \text{IslopeComp}$$

wherein $V_{DAC}$ is the reference voltage 211, $V_{OUT}/FB_{ratio}$ is the feedback voltage 212, $g_{mLoop}$ is the gain which is applied by the control circuit 200 when generating the error voltage 215. $I_L$ is the inductor current 105, Ns is a gain applied to the inductor current 105 and IslopeComp is a slope compensation which is applied in the context of the current based control (within the ramp signal unit 206).

Figure 2B:
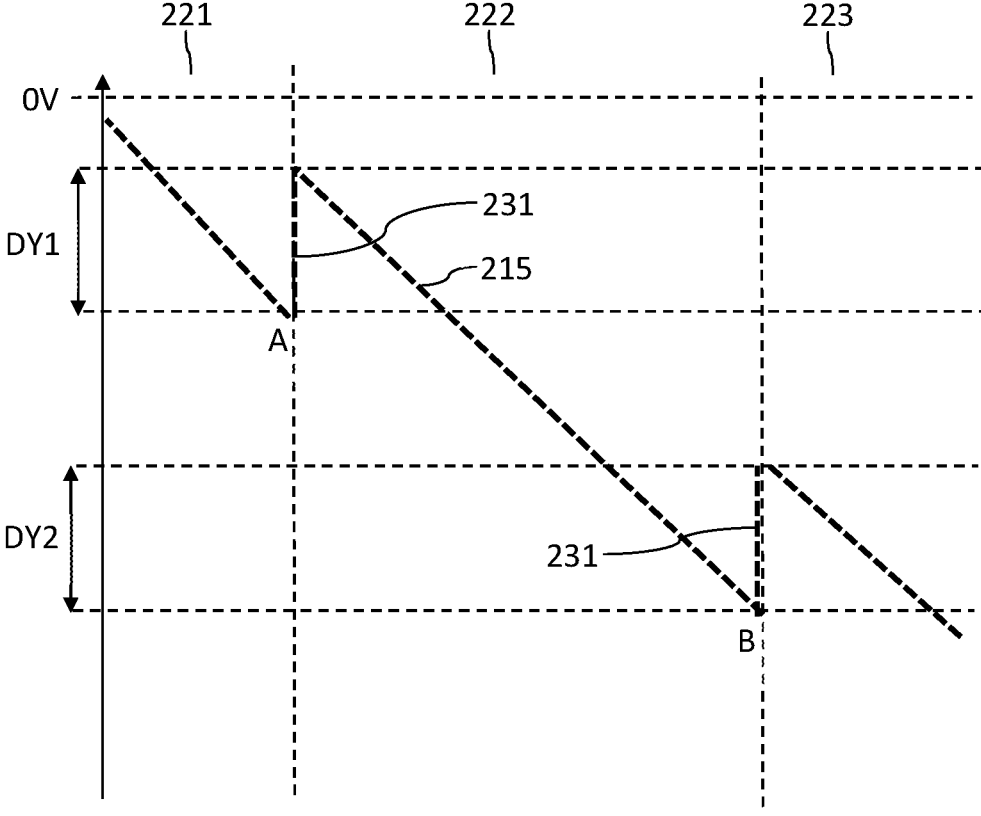
FIG. 2B shows example glitches of the error voltage signal at mode transitions.

This results in discontinuities in the Verror signal 215 at mode transition boundaries between the buck mode, the boost mode and the buck-boost mode, as illustrated in FIG. 2B. These discontinuities cause glitches in the output voltage. In particular, FIG. 2B illustrates the Verror signal 215 across the different modes, in particular the buck mode 221, the buck-boost mode 222 and the boost-mode 223. It can be seen that at the transition between two different modes 221, 222, 223 a glitch 231 of the Verror signal 215 is generated, which causes a corresponding glitch of the output voltage 103.

Hence, it is an objective to remove the glitches 231 in the error signal 215 at the mode transition boundaries. In particular, it is an objective to provide a linear error signal 215 across the transition boundaries regardless of the input and/or output voltage conditions.

This may be achieved by applying an offset within the control circuit 200 that is adjusted based on the operating mode. This adaptive offset removes the glitches 231 and provides a linear error signal 215. Furthermore, this adaptive offset removes the corresponding output voltage glitches and provides an improved output voltage characteristic of the power converter 100.

As indicated above, a buck-boost converter 100 may be used for a portable equipment, as the battery voltage is dependent on the charge state (the battery voltage decreases as the battery discharges). As a result of this, the input voltage of the power converter 100 may be above, about the same, or below the desired output voltage. When using peak-current based control, glitches 231 occur on the error signal 215 at the transition boundaries between operating modes (buck mode 221 to buck-boost mode 222, and/or buck-boost mode 222 to boost mode 223). These glitches 231 typically manifest on the output voltage 103.

As outlined in the present document, an adaptive offset to the error signal 215 may be used, which removes the glitches 231 and which results in a linear error signal 215. As a result, the output voltage 103 does not exhibit glitches at the mode transitions.

Figure 3A:
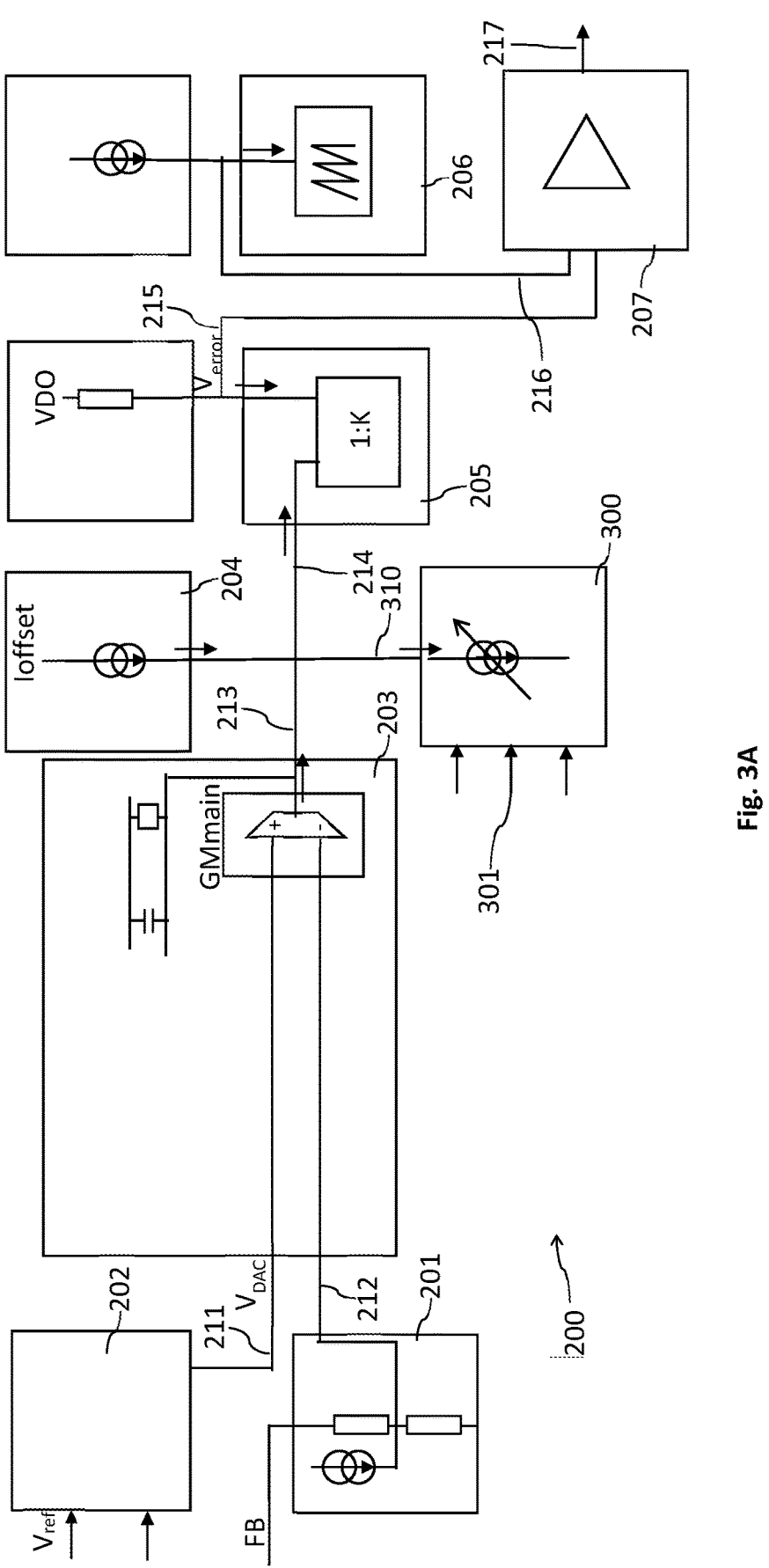
FIG. 3A shows an example control circuit which comprises an error voltage compensation unit.

FIG. 3A shows an example control circuit 200 which comprises an adaptive offset and/or compensation unit 300. The compensation unit 300 may be configured to generate a pedestal signal 310 (i.e., an offset), in particular a pedestal voltage or current, which is configured to offset the delta signal 213 in an adaptive manner. The compensation unit 300 shown in FIG. 3A is only one example of generating a pedestal signal 310.

The compensation unit 300 may be configured to generate the pedestal signal 310 in dependence of the input voltage 102, the output voltage 103, and an indicator 301 which indicates a mode transition and/or which indicates the currently used operation mode 221, 222, 223. Based on this information, the value of the pedestal signal 310 (i.e., of the offset) may be determined using a pre-determined mapping unit, e.g., a pre-determined look-up table.

The mapping unit may be determined as follows (using the power converter 100, which is preferably integrated within its application), For each (VIN, VOUT) pair the $I_{Lpeak}$ and the loop error voltage 215 is determined.

Figure 3B:
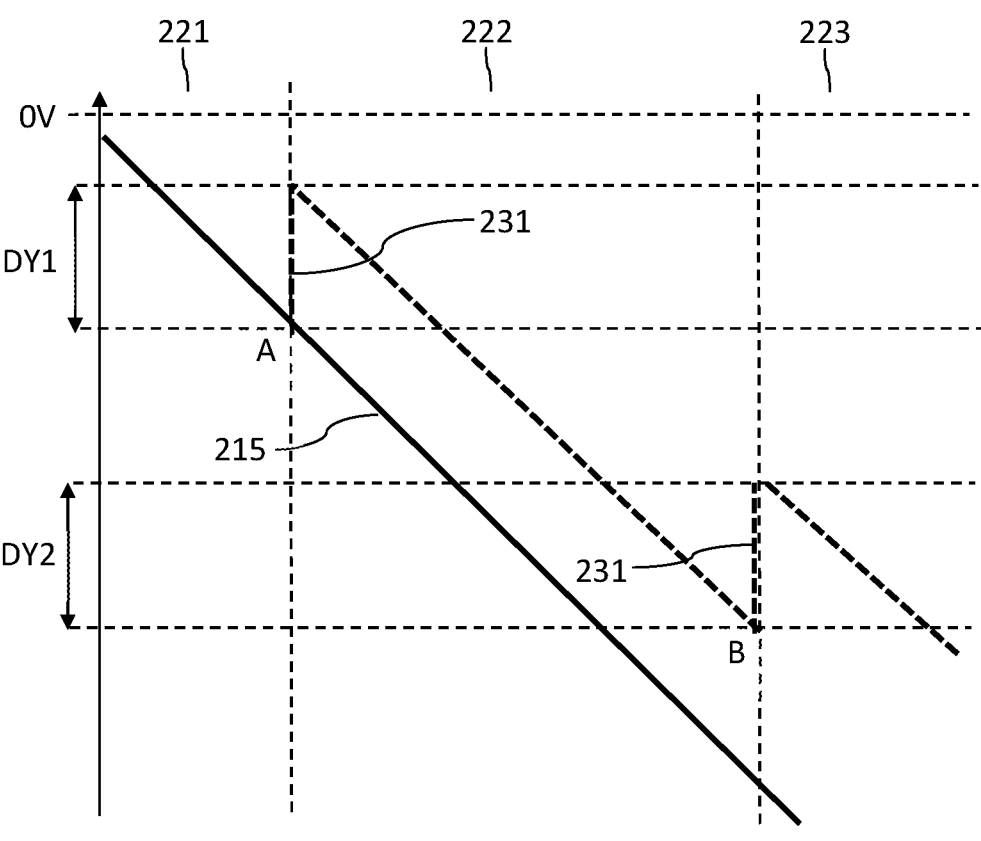
FIG. 3B illustrates the error voltage of the control circuit across different operation modes.

As a result of this, a function Verror=f(VOUT, VIN) may be determined as illustrated e.g. in FIG. 2B or 3B;

Starting from point A in FIG. 2B or 3B DY1 may be determined and based on this, the parameters a1 and b1 may be determined. These parameters may be used to apply an offset [a1*VOUT+b1] for the buck-boost mode 222 only.

In a similar manner, starting from point B in FIG. 2B or 3B DY2 and the parameters a2 and b2 may be determined. These parameters may be used to apply an offset [a2*VOUT+b2] for the boost mode 223 only.

Hence, an adaptive offset for the buck-boost mode 222 and/or for the boost mode 223 may be determined during a calibration phase of the control circuit 200 and/or of the power converter 100. The adaptive offset 310, i.e., the pedestal signal, may then be applied during operation of the control circuit 200 and/or power converter 100, thereby providing the linear curve of the error voltage signal 215 shown in FIG. 3B.

The pedestal voltage 310 may be generated by a plurality of selectable current sources (not illustrated). Depending on the correction needed, the appropriate pedestal offset voltage 310 is produced. To control the selection, the control circuit 200 may make use of a look-up table (not illustrated) that receives Vin 102, Vout 103, and the mode change or the mode 221, 222, 223 (buck to buck/boost and vice versa, buck/boost to boost, and vice versa). Based on the Vin and Vout inputs as well as based on the mode or mode change, the lookup table selects the appropriate current source to provide the desired pedestal offset voltage 310 to the generation of the error voltage 215.

Figure 4:
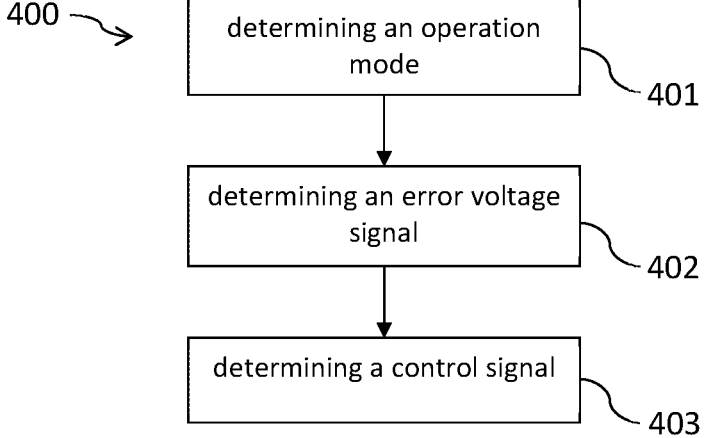
FIG. 4 shows a flow chart of an example method for controlling a buck-boost power converter.

FIG. 4 shows a flow chart of an example (possibly computer-implemented) method 400 for controlling a buck-boost power converter 100, which is configured to provide at an output node of the power converter 100 an output current 104 at an output voltage 103 based on electrical power at an input voltage 102 which is provided at an input node of the power converter 100 (e.g., by a battery).

The method 400 comprises determining 401 an operation mode 221, 222, 223 of the power converter 100 that the power converter 100 is operated in. The mode 221, 222, 223 may be determined based on the conversion ratio M between the input voltage 102 and the output voltage 103.

Furthermore, the method 400 comprises determining 402 an error voltage signal 215 based on the output voltage 103, based on the reference voltage 211 for the output voltage 103 and based on the determined operation mode 221, 222, 223 of the power converter 100 (and/or based on the mode transition). By taking into account the operation mode 221, 222, 223 when generating the error voltage signal 215, glitches 231 may be avoided at mode transitions. In particular, the error voltage signal 215 may be generated such that the error voltage signal 215 does not comprise any glitches 231 at a mode transition between two different operation modes 221, 222, 223 of the power converter 100. By consequence, corresponding glitches 231 in the output voltage 103 may be avoided in a reliable and efficient manner.

In addition, the method 400 comprises determining 403 a control signal 217 for controlling one or more power switches 111, 112, 113, 114 of the power converter 100 in dependence of the error voltage signal 215.

Hence, a control circuit 200 for controlling a buck-boost power converter 100 is described, wherein the power converter 100 is configured to provide at an output node of the power converter 100 an output current 104 at an output voltage 103 based on electrical power at an input voltage 102, which is provided at an input node of the power converter 100.

The control circuit 200 is configured to determine the operation mode 221, 222, 223 that the power converter 100 is operated in. In particular, the operation mode 221, 222, 223 that the power converter 100 is operated in may be selected from a plurality of different operation modes 221, 222, 223. The plurality of operation modes 221, 222, 223 may comprise a buck mode 221, a buck-boost mode 222 and/or a boost mode 223. The operation mode 221, 222, 223 may be determined based on the conversion ratio and/or based on the input voltage 102.

The control circuit is further configured to determine an error voltage signal 215 based on the output voltage 103, based on a reference voltage 211 for the output voltage 103 and based on the determined operation mode 221, 222, 223 of the power converter 100.

In particular, the control circuit 200 may be configured to determine a delta signal 213 based on the output voltage 103 and based on the reference voltage 211. For this purpose, the control circuit 200 may comprise a feedback unit 201 configured to generate a feedback voltage 212 based on the output voltage 103. In addition, the control circuit 200 may comprise a comparison unit 203 configured to compare the feedback voltage 212 with the reference voltage 211 to generate the delta signal 213.

The delta signal 213 may then be offset in dependence of the determined operation mode 221, 222, 223 of the power converter 100, to determine the error voltage signal 211 in a precise and efficient manner.

The control circuit 200 is further configured to determine a control signal 217 for controlling one or more power switches 111, 112, 113, 114 of the power converter 100 in dependence of the error voltage signal 215. The control signal 217 may be indicative of the duty cycle (of one or more power switches 111, 112, 113, 114) within an operation cycle 120 of the operation mode 221, 222, 223 that the power converter 100 is operated in.

The control circuit 200 may be configured to determine an offset 310 (notably a pedestal voltage) for offsetting the delta signal 213, based on the output voltage 103 and based on the operation mode 221, 222, 223 of the power converter 100. The offset 310 may be determined in a precise manner using a (pre-determined) mapping unit, wherein the mapping unit may be indicative of a relationship, in particular a functional relationship and/or a look-up table, between the output voltage 103 and the operation mode 221, 222, 223 of the power converter 100 on one side, and the corresponding offset 310 on the other side. Hence, the mapping unit may comprise a look-up table. Alternatively, or in addition, the mapping unit may comprise a processor and appropriate software to implement the functional relationship between the output voltage 103 and the operation mode 221, 222, 223 of the power converter 100 on one side, and the corresponding offset 310 on the other side. The offset 310 which has been determined by the mapping unit may then be generated by the compensation unit 300 (which may e.g., comprise a current source).

In a preferred example, the control circuit 200 is configured to determine the offset 310 using a polynomial function, in particular the function a*Vout+b, comprising one or more polynomial parameters, in particular a and b, wherein Vout is the output voltage 103. The one or more polynomial parameters may be dependent on the operation mode 221, 222, 223 of the power converter 100.

The offset 310 may be applied to the delta signal 213, to determine the error voltage signal 211 in a particular precise and efficient manner.

The operation mode 221, 222, 223 that the power converter 100 is operated in may be used for a range of conversion ratios between the input voltage 102 and the output voltage 103. The control circuit 200 may be configured to determine and to apply an offset 310 to the delta signal 213 for the entire range of conversion ratios (starting from one edge of the range to the other edge of the range). The offset 310 may vary across the range (e.g., in dependence of the output voltage 103 and/or in dependence of the conversion ratio). By doing this, the error voltage signal 211 may be determined in a particular precise and efficient manner.

The control circuit 200 may comprise a plurality of current sources, each configured to generate an offset current. Furthermore, the control circuit 200 may be configured to control and/or to select one or more of the plurality of current sources in dependence of the operation mode 221, 222, 223 of the power converter 100, to offset the delta signal 213 using the offset current which is provided by the one or more current sources. By making use of current sources, the offset 310 may be generated in a particularly efficient and precise manner.

The control circuit 200 may be configured to perform a current, in particular a peak current, control of the power converter 100. In particular, the control circuit 200 may be configured to generate a (sawtooth) ramp signal 216 in dependence of the inductor current 105 through the inductor 115 of the power converter 100. The voltage error signal 215 may be compared with the ramp signal 216 to generate the control signal 217 in a precise and robust manner.

Furthermore, a buck-boost power converter 100 is described which comprises the control circuit 200 described herein.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A control circuit for controlling a buck-boost power converter, which is configured to provide at an output node of the power converter an output current at an output voltage based on electrical power at an input voltage which is provided at an input node of the power converter, wherein the control circuit is configured to: determine an operation mode that the power converter is operated in; determine an error voltage signal based on the output voltage, based on a reference voltage for the output voltage and based on the determined operation mode of the power converter; and determine a control signal for controlling one or more power switches of the power converter in dependence of the error voltage signal, wherein the control circuit is configured to: determine a delta signal based on the output voltage and based on the reference voltage; and offset the delta signal in dependence of the determined operation mode of the power converter to determine the error voltage signal, wherein the delta signal is offset for removing glitches in the error voltage signal and the output voltage across transition boundaries between operating modes and the delta signal is offset so that the error voltage signal is linear across transition boundaries between operation modes; and the offset is determined based on a mapping or polynomial relationship between the output voltage and the operation mode so that the resulting error voltage signal remains linear across mode-transition boundaries.

2. The control circuit of claim 1, wherein the control circuit comprises:
   a feedback unit configured to generate a feedback voltage based on the output voltage; and
   a comparison unit configured to compare the feedback voltage with the reference voltage to generate the delta signal.

3. The control circuit of claim 1, wherein the control circuit is configured to:
   determine an offset for offsetting the delta signal based on the output voltage and based on the operation mode of the power converter; and
   apply the offset to the delta signal to determine the error voltage signal.

4. The control circuit of claim 3, wherein:
   the control circuit is configured to use a mapping unit for determining the offset; and
   the mapping unit is indicative of a functional relationship and/or a look-up table, between the output voltage and the operation mode of the power converter on one side, and the corresponding offset on the other side.

5. The control circuit of claim 3, wherein:
   the control circuit is configured to determine the offset using a polynomial function, $a*V_{out}+b$, where a and b are polynomial parameters;
   $V_{out}$ is the output voltage; and
   the one or more polynomial parameters are dependent on the operation mode of the power converter.

6. The control circuit of claim 3, wherein:
   the operation mode that the power converter is operated in is used for a range of conversion ratios between the input voltage and the output voltage; and
   the control circuit is configured to determine and to apply the offset to the delta signal for the range of conversion ratios.

7. The control circuit of claim 1, wherein:

the control circuit comprises a plurality of current sources, each configured to generate an offset current; and the control circuit is configured to control and/or to select one or more of the plurality of current sources in dependence of the operation mode of the power converter, to offset the delta signal using the offset current which is provided by the one or more current sources.

8. The control circuit of claim 1, wherein the control circuit is configured to:

generate a ramp signal in dependence of an inductor current through an inductor of the power converter; and compare the error voltage signal with the ramp signal to generate the control signal.

9. The control circuit of claim 1, wherein the control circuit is configured to perform a peak control of the power converter.

10. The control circuit of claim 1, wherein the control signal is indicative of a duty cycle within an operation cycle of the operation mode that the power converter is operated in.

11. The control circuit of claim 1, wherein:

the control circuit is configured to select the operation mode that the power converter is operated in from a plurality of different operation modes; and the plurality of operation modes comprises a buck mode, a buck-boost mode and a boost mode.

12. A system comprising:

the control circuit according to claim 1; and the buck-boost power converter.

13. A method for controlling a buck-boost power converter, which is configured to provide at an output node of the power converter an output current at an output voltage based on electrical power at an input voltage which is provided at an input node of the power converter, wherein the method comprises: determining an operation mode that the power converter is operated in; determining an error voltage signal based on the output voltage, based on a reference voltage for the output voltage and based on the determined operation mode of the power converter; and determining a control signal for controlling one or more power switches of the power converter in dependence of the error voltage signal, wherein the method further comprises: determining a delta signal based on the output voltage and based on the reference voltage; and offsetting the delta signal in dependence of the determined operation mode of the power converter to determine the error voltage signal, wherein the delta signal is offset for removing glitches in the error voltage signal and the output voltage across transition boundaries between operating modes and the delta signal is offset so that the error voltage signal is linear across transition boundaries between operation modes; and the offset is determined based on a mapping or polynomial relationship between the output voltage and the operation mode so that the resulting error voltage signal remains linear across mode-transition boundaries.

14. The control circuit of claim 1, wherein the operation mode that the power converter is operated in is determined based on an indicator.

15. A control circuit for controlling a buck-boost power converter, which is configured to provide at an output node of the power converter an output current at an output voltage based on electrical power at an input voltage which is provided at an input node of the power converter, wherein the control circuit is configured to: determine an operation mode that the power converter is operated in; determine an error voltage signal based on the output voltage, based on a reference voltage for the output voltage and based on the determined operation mode of the power converter; and determine a control signal for controlling one or more power switches of the power converter in dependence of the error voltage signal, wherein the control circuit is configured to: determine a delta signal based on the output voltage and based on the reference voltage; and determine an offset for offsetting the delta signal based on the output voltage and based on the operation mode of the power converter; and offset the delta signal in dependence of the determined operation mode of the power converter, to determine the error voltage signal, and the offset is determined based on a mapping or polynomial relationship between the output voltage and the operation mode so that the resulting error voltage signal remains linear across mode-transition boundaries; and wherein: the control circuit is configured to use a mapping unit for determining the offset; and the mapping unit comprises a look-up table, between the output voltage and the operation mode of the power converter on one side, and the corresponding offset on the other side.

16. A control circuit for controlling a buck-boost power converter, which is configured to provide at an output node of the power converter an output current at an output voltage based on electrical power at an input voltage which is provided at an input node of the power converter, the control circuit comprising a look-up table comprising a plurality of offset values corresponding to the output voltage and an operation mode that the power converter is operated in, wherein the control circuit is configured to:

determine the operation mode that the power converter is operated in; and determine an error voltage signal based on the output voltage, based on a reference voltage for the output voltage and based on the determined operation mode of the power converter; and determine a control signal for controlling one or more power switches of the power converter in dependence of the error voltage signal, wherein the control circuit is configured to:

determine at least one operation mode transition boundary in the error voltage signal, wherein the at least one operation mode transition boundary corresponds to a discontinuity in the output voltage in response to determining the at least one operation mode transition boundary, generate an indicator signal indicating the at least one operation mode transition boundary; and determine an offset signal based on the input voltage, the output voltage, the indicator signal and the look-up table, such that the error voltage signal is linear across the at least one operation mode transition boundary.

* * * * *